United States Patent
Matsuda

(10) Patent No.: US 8,899,369 B2
(45) Date of Patent: Dec. 2, 2014

(54) STRADDLE-TYPE ELECTRIC VEHICLE, AND MOUNTING STRUCTURE OF ELECTRIC POWER CONTROLLER IN ELECTRIC VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/976,431

(22) PCT Filed: Dec. 27, 2010

(86) PCT No.: PCT/JP2010/007581
§ 371 (c)(1),
(2), (4) Date: Jun. 26, 2013

(87) PCT Pub. No.: WO2012/090246
PCT Pub. Date: May 7, 2012

(65) Prior Publication Data
US 2013/0270023 A1    Oct. 17, 2013

(51) Int. Cl.
*B62K 11/04* (2006.01)
*B62K 11/00* (2006.01)

(52) U.S. Cl.
CPC .................. *B62K 11/00* (2013.01); *B62K 11/04* (2013.01); *B62K 2204/00* (2013.01); *B62K 2208/00* (2013.01)
USPC ....................................................... 180/220

(58) Field of Classification Search
CPC ............ B62M 6/00; B62M 6/80; B62M 6/85; B62M 6/90; B60L 11/1877
USPC ............................ 180/220; 320/104, 107, 114
See application file for complete search history.

(56) References Cited

U.S. PATENT DOCUMENTS 7,400,111 B2 *   7/2008  Kishibata et al. ............. 320/104
7,847,515 B2 * 12/2010  Schroeck et al. ............. 320/106

FOREIGN PATENT DOCUMENTS

| JP | 08072780 A |   | 3/1996 |
|----|------------|---|--------|
| JP | 10258085 A |   | 9/1998 |
| JP | 2001114157 A |  | 4/2001 |
| JP | 2003127956 A | * | 5/2003 |
| JP | 2003189539 A |  | 7/2003 |
| JP | 2010100124 A |  | 5/2010 |

OTHER PUBLICATIONS

Japanese Patent Office, International Search Report of PCT/JP2010/007581, Apr. 4, 2011, WIPO, 2 pages.

* cited by examiner

*Primary Examiner* — Joseph M Rocca
*Assistant Examiner* — Felicia L Brittman
(74) *Attorney, Agent, or Firm* — Allenman Hall McCoy Russell & Tuttle LLP

(57) ABSTRACT

A straddle-type electric vehicle (e.g., electric motorcycle 1) comprising a driving motor and an electric power control unit for controlling electric power supplied from batteries to the driving motor, a case of the electric power control unit is mounted from a location outward of the battery box, and electrode terminals protruding outward from the case are inserted into insertion holes of the battery box. The electrode terminals protruding into inside of the battery box are connected to electrodes of the batteries via electric conductors such as bus bars. In this structure, electric connecting work between the batteries and the electric power control unit can be easily carried out, high-voltage lines can be minimized in length, and the high-voltage lines are not exposed to the outside.

11 Claims, 5 Drawing Sheets

STRADDLE-TYPE ELECTRIC VEHICLE, AND MOUNTING STRUCTURE OF ELECTRIC POWER CONTROLLER IN ELECTRIC VEHICLE

TECHNICAL FIELD

The present invention relates to a straddle-type electric vehicle including an electric motorcycle incorporating an electric motor as a driving source, an ATV (all terrain vehicle) incorporating the electric motor as the driving source, and a hybrid electric vehicle incorporating an engine in addition to the electric motor. Particularly, the present invention relates to a structure for mounting the electric power controller in the vehicle.

BACKGROUND ART

Conventionally, as an example of a mounting structure of electric components in an electric vehicle, in an electric motorcycle disclosed in Patent Literature 1, battery electric components such as a main relay, a DC/DC converter, a current sensor, and a monitoring ECU, are accommodated into a battery box accommodating a number of batteries.

By comparison, a motor controller (electric power controller) which generates heat of a great amount is accommodated into a case separate from the battery box and placed under a floor of the battery box so that the motor controller is cooled by ram air. Also, the battery box is provided with an air discharge port which faces the motor controller.

CITATION LIST

Patent Literature

Patent Literature 1: Japanese Laid-Open Patent Application Publication No. 2001-114157

SUMMARY OF INVENTION

Technical Problem

In the conventional example, high-voltage lines connecting the batteries to the main relay, the DC/DC converter, etc., are accommodated in the battery box, but high-voltage lines connecting the batteries to the motor controller penetrate a bottom portion of the battery box and are drawn to outside of the battery box. This causes a need for many wiring members. Therefore, there is room for reduction of a loss caused by electric resistance.

Since the high-voltage lines connecting the batteries to the motor controller are exposed to outside of the battery box, it is necessary to cover the exposed high-voltage lines with a cover, or the like so that a user of the vehicle does not touch them inadvertently. Therefore, connecting/wiring work tends to become messy.

An object of the present invention is to provide a straddle-type electric vehicle which can reduce, as much as possible, a length of high-voltage lines connecting an electric storage device to an electric power controller, eliminate a need for a cover or the like for covering high-voltage lines by placing the high-voltage lines such that they are not exposed, and make it easier to perform wiring work of the high-voltage lines.

Solution to Problem

To achieve the above stated objective, a straddle-type electric vehicle of the present invention comprises an electric motor for driving the electric vehicle; an electric storage device for storing electric power supplied to the electric motor; and an electric power controller for controlling the electric power supplied from the electric storage device to the electric motor; wherein a case of the electric power controller is mounted to an accommodating box of the electric storage device from outward; wherein the case is provided with an electrode terminal connected to an electric circuit inside of the case such that the electrode terminal protrudes outward from the case; and wherein a floor portion or a side wall portion of the accommodating box has an insertion hole into which the electrode terminal of the case is inserted, and the electrode terminal which is inserted into the insertion hole and protrudes into inside of the accommodating box is connected to an electrode of the electric storage device via an electric conductor.

In accordance with this configuration, in a state in which the electric power controller is mounted to the accommodating box of the electric storage device from outward, the electrode terminal protruding from the case of the electric power controller is inserted into the insertion hole of the floor portion or the side wall portion of the accommodating box and protrudes inside of the accommodating box. Therefore, the electrode terminal has only to be connected to the electric conductor. Since the electric conductor and the electrode terminal which are applied with a high voltage are present inside of the accommodating box and are not exposed to outside, there is no need for a cover covering the electric conductor and the electrode terminal, and the high-voltage line can be minimized in length.

Preferably, the accommodating box may open upward, and the floor portion of the accommodating box may have the insertion hole. The case may be mounted to the floor portion of the accommodating box from below. Thus, since the electrode terminal protrudes upward into inside of the accommodating box of a relatively great size, through the insertion hole of the floor portion, a worker can insert hands into the accommodating box through the opening of the accommodating box from above and easily connect the electrode terminal and the electric conductor to each other with an easy posture while seeing the electrode terminal and the electric conductor before the electric storage device is accommodated into the accommodating box.

The accommodating box may be placed in an inclined state such that the floor portion is directed downward and obliquely forward. Thus, the case of the electric power controller which is mounted to the floor portion from below can be cooled efficiently by ram air. Alternatively, a rear side wall portion of the accommodating box may be provided with the insertion hole instead of the floor portion of the accommodating box, and the case of the electric power controller may be mounted to the rear side wall portion of the accommodating box from rearward. This has an advantage that bouncing stones are likely to contact the case.

For example, like a motorcycle, when a vehicle body frame includes a head pipe and a main frame extending rearward from the head pipe such that the main frame is inclined downward, the accommodating box may extend along the main frame between a front wheel and a rear wheel, and a lower surface of the floor portion of the accommodating box may protrude obliquely forward to be lower than a lower edge of the main frame, and the case of the electric power controller may be mounted to the lower surface of the floor portion of the accommodating box. Thus, the case can be cooled more effectively by the air. In addition, when the case of the electric power controller is mounted to the floor portion of the accommodating box in a location which is rearward and relatively lower, a user is less likely to contact the case.

Preferably, the floor portion or the side wall portion of the accommodating box which has the insertion hole as described above may be provided with a frame portion extending toward a facing surface of the case which faces the floor portion or the side wall portion such that the frame portion surrounds the facing surface. Since the frame portion provided on the floor portion or the side wall portion of the accommodating box surrounds the facing surface of the case, it becomes possible to effectively prevent entry of rain water, mud, etc., into the case.

The facing surface of the case of the electric power controller may be provided with a joint surface which is joined to the floor portion or the side wall portion of the accommodating box such that the joint surface surrounds at least the electrode terminal. Thus, since the electrode terminal is isolated from surroundings in the joint surface of the accommodating box and the joint surface of the case, it becomes possible to prevent entry of rain water, mud, etc.

For example, an entire or a portion of the facing surface of the case of the electric power controller may be provided with a flat joint surface, and the electrode terminal may protrude from the flat joint surface. Or, a stepped surface which is lower may be provided in an inward region surrounded by the flat joint surface, and the electrode terminal may protrude from the stepped surface. In the same manner, the floor portion or the side wall portion of the accommodating box may be provided with a flat joint surface and a stepped surface surrounded by the joint surface, and the insertion hole may open in the stepped surface. Because of the stepped surface, water which may enter a clearance between the joint surfaces is less likely to contact the electrode terminal.

Preferably, the floor portion or the side wall portion of the accommodating box which has the insertion hole as described above may be provided with a swelling portion which surrounds the insertion hole and swells inward in the accommodating box, and the insertion hole may open in a swelling surface of the swelling portion. In this configuration, if rain water enters inside of the accommodating box or water droplets are generated inside of the accommodating box, a possibility that this water will reach the swelling surface along the floor surface or the wall surface of the accommodating box is low. Therefore, the water is less likely to contact the electrode terminal.

When the floor portion or the side wall portion of the accommodating box is provided with the swelling portion, a recess is provided on its reverse side. Therefore, the case may be provided with a seat portion swelling outward from the case such that the seat portion is placed into the recess, and the electrode terminal may protrude from the seat portion. Thus, even when the water enters the clearance between the accommodating box and the case of the electric power controller, it is less likely to reach the swelling surface of the seat portion, and hence is less likely to contact the electrode terminal.

As preferable constituents inside of the accommodating box, the electric conductor may be elongated and may be provided to extend from a location in the vicinity of the insertion hole of the floor portion or the side wall portion of the accommodating box to an upper portion of the accommodating box. Thus, one end portion of the electric conductor is connected to the electrode terminal protruding into inside of the accommodating box through the insertion hole of the floor portion or the side wall portion of the accommodating box as described above, then the electric storage device is accommodated into the accommodating box, and in this state, the electrode of the electric storage device is easily connected to the other end portion of the electric conductor. To this end, preferably, the other end portion of the electric conductor is extended to a location as high as the electrode at an upper portion of the electric storage device along the side wall of the accommodating box, for example.

The accommodating box may be made of resin and supported on a vehicle body frame, and the case of the electric power controller may be supported on the accommodating box. Because of the presence of the accommodating box made of resin, a noise-proof property of the case of the electric power controller can be expected. More preferably, the accommodating box is supported on the vehicle body frame via a vibration-proof mount.

According to another aspect of the present invention, in a mounting structure of an electric power controller in a straddle-type electric vehicle comprising an electric motor for driving the electric vehicle; and an electric power controller for controlling electric power supplied to the electric motor, when an electric storage device for storing the electric power supplied to the electric motor is accommodated into an accommodating box, a case of the electric power controller is mounted to the accommodating box of the electric storage device from outward. Specifically, the case of the electric power controller is provided with an electrode terminal connected to an electric circuit inside of the case such that the electrode terminal protrudes outward from the case, while a floor portion or a side wall portion of the accommodating box has an insertion hole into which the electrode terminal is inserted, and the electrode terminal which is inserted into an insertion hole and protrudes into inside of the accommodating box is connected to the electrode of the electric storage device via an electric conductor.

Advantageous Effects of Invention

In accordance with the present invention, in the straddle-type electric vehicle in which the electric motor for driving the electric vehicle or the electric power controller tends to be exposed to outside, the case of the electric power controller is mounted to the accommodating box of the electric storage device, and connected thereto in a mounting location. Therefore, the work for connecting the case to the accommodating box can be easily carried out. In addition, since the length of the high-voltage line can be reduced as much as possible, and is not exposed to outside, there is no need for a cover, etc., for covering the high-voltage line.

DESCRIPTION OF EMBODIMENTS

Hereinafter, an electric motorcycle according to an embodiment of the present invention will be described with reference to the drawings. The stated directions recited below are from the perspective of a driver straddling the electric motorcycle.

—Schematic Configuration of Electric Motorcycle—

Figure 1:
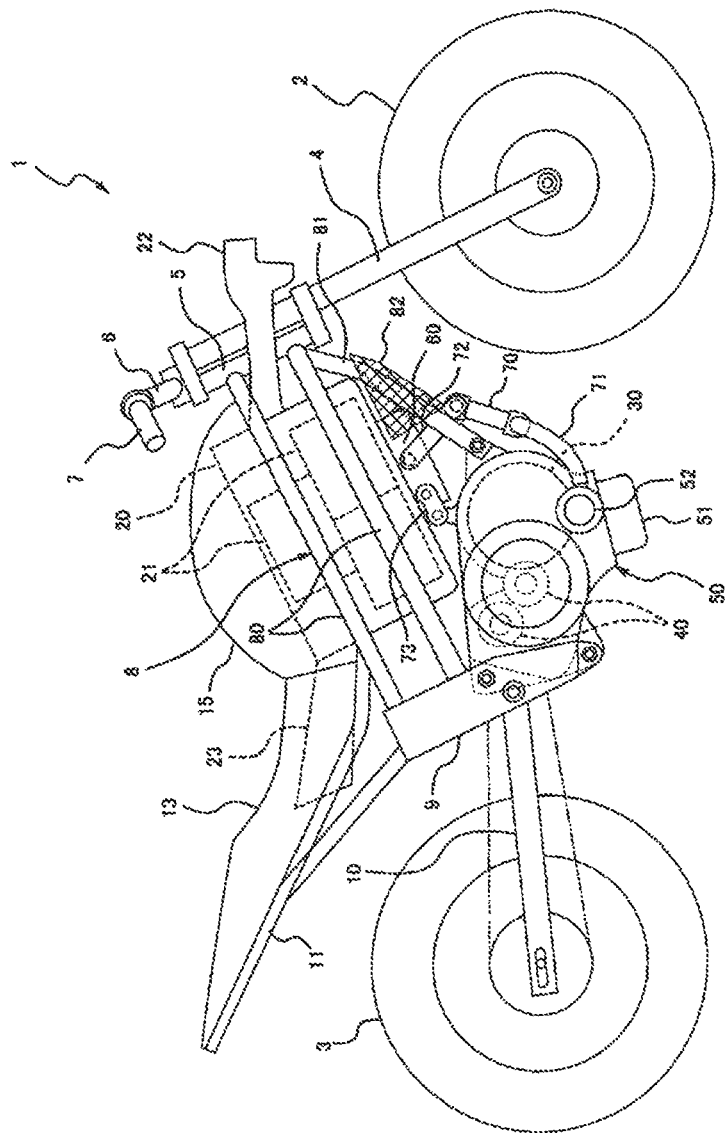
FIG. 1 is a right side view showing major components in an electric motorcycle according to an embodiment of the present invention.

FIG. 1 is a right side view schematically showing major components such as a vehicle body frame, a power plant, and wheels, in an electric motorcycle 1 (electric vehicle) according to an embodiment of the present invention. As shown in FIG. 1, the electric motorcycle 1 includes a front wheel 2 which is a steering wheel and a rear wheel 3 which is a drive wheel. The front wheel 2 is rotatably mounted to lower end portions of a pair of right and left front forks 4 extending substantially vertically. Upper portions of the front forks 4 are mounted to a steering shaft (not shown) via a pair of upper and lower brackets.

The steering shaft is rotatably supported in a state in which the steering shaft is inserted into a head pipe 5 mounted to a vehicle body, and constitutes a steering axis. A handle 6 extending in a rightward and leftward direction is attached to the upper bracket. When the driver manipulates the handle 6, the front forks 4 and the front wheel 2 can be steered around the steering shaft. The handle 6 is provided at a right end with an accelerator grip 7 which is gripped by the driver's right hand and rotated by twisting the driver's wrist.

The vehicle body frame of the electric motorcycle 1 includes a main frame 8 extending rearward from the head pipe 5 such that the main frame 8 is inclined slightly downward. For example, the main frame 8 is divided into two parts, i.e., right and left parts, at a front end portion thereof welded to the head pipe 5. The right and left parts are each composed of pipe members 80 arranged at upper and lower sides. The pipe members 80 extend rearward from the head pipe 5, extend rightward and leftward, are curved inward, and then extend rearward such that the pipe members 80 corresponding to the right part are apart from the pipe members 80 corresponding to the left part. Then, the pipe members 80 are curved inward and then rear end portions thereof are coupled to a pivot frame 9.

The pivot frame 9 has a substantially rectangular frame shape. The rear end portions of the pipe members 80 of the main frame 8 are joined and welded to right and left side plates of the pivot frame 9 from inward. Front end portions of a swing arm 10 supporting the rear wheel 3 are mounted between the right and left side plates of the pivot frame 9 such that the swing arm 10 is vertically pivotable. The swing arm 10 extends rearward from its pivot such that it is inclined slightly downward. The rear wheel 3 is rotatably mounted to rear end portions of the swing arm 10.

A rear frame 11 extends from the rear portions of the main frame 8 and upper end portions of the pivot frame 9 such that the rear frame 11 is inclined upward in a rearward direction. A straddle seat 13 is mounted over the rear frame 11. A knee grip cover 15 is disposed in front of the seat 13. The driver straddling the electric motorcycle 1 grips the knee grip cover 15 between the driver's knees. By gripping the knee grip cover 15 with the driver's knees, the driver feels unity with the electric motorcycle 1.

A battery box 20 (accommodating box of electric storage device) accommodating batteries 21 which are the electric storage device, is disposed such that the battery box 20 is covered with the knee grip cover 15 from above. For example, the battery box 20 is surrounded by the four pipe members 80 of the main frame 8 from right and from left. Right and left side wall portions of the battery box 20 are fastened to the pipe members 80, respectively, by bolts, or the like.

As will be described in detail later, in the present embodiment, the batteries 21 are accommodated into the battery box 20 such that the batteries 21 are separated into right and left modules, and a ram air path is formed between the right and left modules. An air guide duct 22 is integrally provided on a front wall of the battery box 20 to guide the ram air from forward into the battery box 20 during driving of the electric motorcycle 1, while an air discharge duct 23 is integrally provided on a rear wall of the battery box 20.

For example, a front portion of the air guide duct 22 extends forward farther than the head pipe 5. The ram air taken in through the air guide duct 22 is guided to inside of the battery box 20, flows through a space between the right and left modules of the batteries 20, and is discharged through the air discharge duct 23. The air discharge duct 23 extends rearward through a space below the seat 13. The air is discharged smoothly rearward relative to the electric motorcycle 1 through the air discharge duct 23.

When viewed from a side as shown in FIG. 1, the battery box 20 is provided in a location close to a center of a vehicle body in a range from the head pipe 5 to the pivot frame 9 in the electric motorcycle 1, and extends along the main frame 8. That is, the battery box 20 having a great weight is mounted in the vicinity of a roll axis, which is preferable to enhance the motion performance of the electric motorcycle 1. A lower surface of the battery box 20 protrudes obliquely forward to be lower than a lower edge of the main frame 8, i.e., the lower pipe member 80, and is inclined to be gradually lower in a direction from its front edge to its rear edge.

In close proximity to and below a rear edge of the lower surface which is the lowest location of the inclined battery box 20, a motor unit 50 including a driving motor 30 constituted by an electric motor and a transmission 40 (power transmission mechanism) is disposed. A rear portion of the motor unit 50 is an accommodating section of the transmission 40. Right and left portions of the accommodating section of the transmission 40 are fastened to and supported by the right and left side plates of the pivot frame 9. By comparison, a front portion of the motor unit 50 is an accommodating section of the driving motor 30. Right and left portions of the accommodating section of the driving motor 30 are supported by hanger brackets 81 extending downward from the front portion of the main frame 8.

An electric power control unit 60 (electric power controller) is disposed on the lower surface of the battery box 20 in close proximity to and above the motor unit 50. As will be described later with reference to FIG. 6, the electric power control unit 60 is configured in such a manner that a power module 61 incorporating a power semiconductor such as an IGBT (insulated-gate bipolar transistor) is accommodated into a case 62. The electric power control unit 60 is mounted to a portion of the lower surface of the battery box 20, which portion is in a range from its center to its front portion and directly receives the ram air flowing through a space between the right and left hanger brackets 81.

A protective net 82 (protective member) is attached over upper portions of the right and left hanger brackets 81 such that the protective net 82 covers a forward side, right and left sides, and an underside of the electric power control unit 60. The protective net 82 is formed of, for example, a metal net, a punching metal, etc., and has meshes which inhibit bouncing stones from passing therethrough, while allowing the ram air to pass therethrough.

An oil cooler 70 is mounted to lower portions of the right and left hanger brackets 81. As will be described later, a cooler 66 is incorporated into the electric power control unit 60. Oil is cooled by the oil cooler 70 and then is fed to the cooler 66 through an upper hose 72 (oil feeding line) to cool the power module 61. After that, the oil flows downward through a return hose 73 (oil return line) and is returned to the motor unit 50.

Although not described in detail, in the present embodiment, a case of the motor unit 50 of the present embodiment is provided with an oil pan 51 which stores oil used for lubricating and cooling the driving motor 30 and the transmission 40, and an oil pump 52 for suctioning up the oil from the oil pan 51. The oil discharged from the oil pump 52 is fed with pressure to the oil cooler 70 via a lower hose 71 (oil feeding line). A portion of the oil discharged from the oil pump 52 is fed to the bearings of the driving motor 30, clutches and gear trains of the transmission 40, to lubricate and cool them.

In the present embodiment, the driving motor 30 is a motor/generator which is capable of a motor operation and a power generation operation. The driving motor 30 operates as a motor by the electric power supplied from the batteries 21 via the electric power control unit 60, and outputs driving power to the rear wheel 3. By comparison, during regenerative braking of the electric motorcycle 1, the driving motor 30 operates as a generator to generate AC power. The AC power is converted into DC power by an inverter of the electric power control unit 60 and is stored in the batteries 21. Control for the operation of the driving motor 30 and control for charge and discharge of the batteries 20 are executed by a known method.

—Mounting Structure of Batteries—

Figure 2:
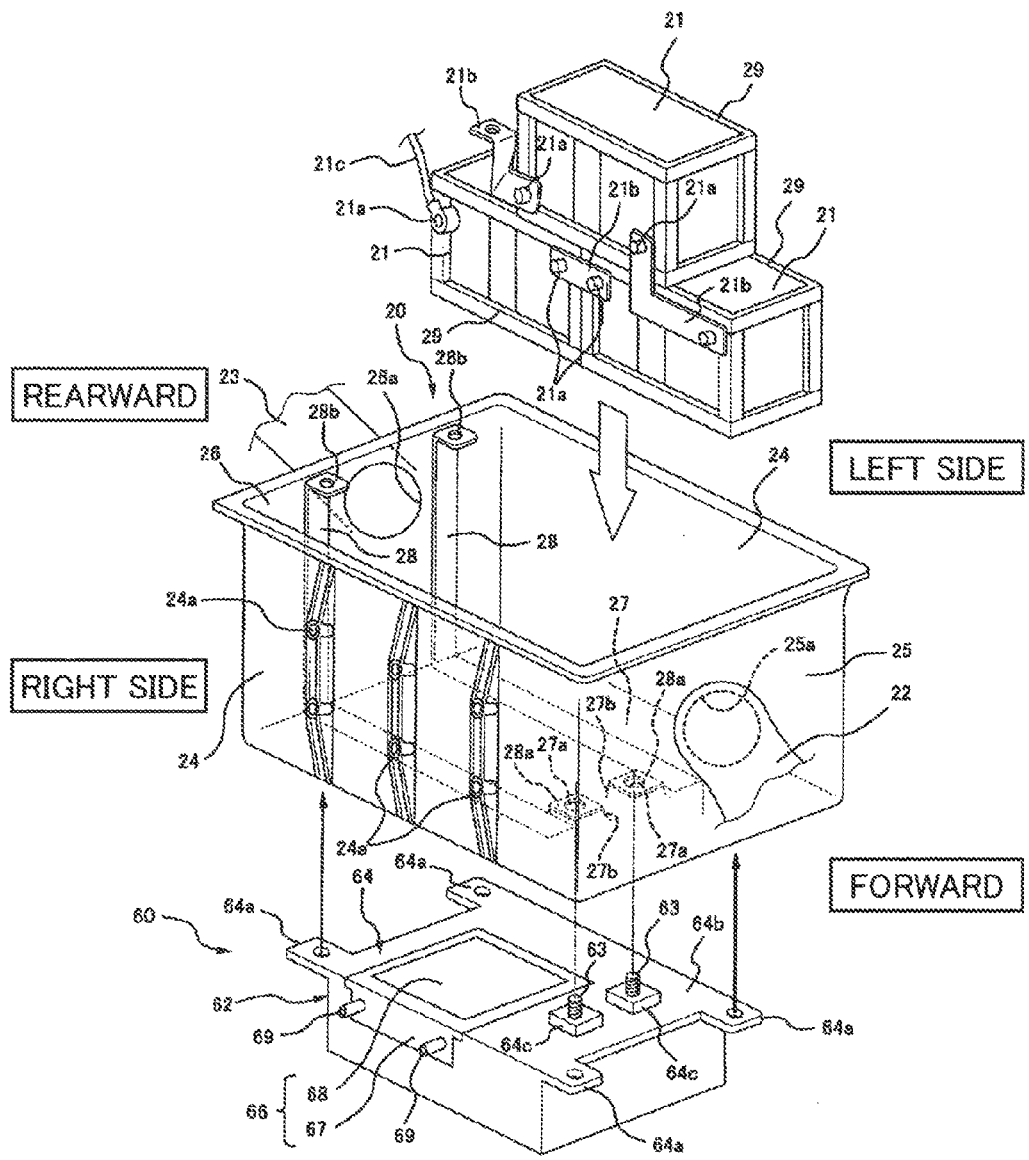
FIG. 2 is a perspective view showing a structure of a battery box.

In the present embodiment, to isolate high-voltage lines from the driver and protect them from rain water or the like, the batteries 21 are accommodated into the battery box 20 made of a resin. FIG. 2 shows a state in which the battery box 20 is detached from the main frame 8 and illustrated as a single unit. As shown in FIG. 2, the battery box 20 is a rectangular casing which opens upward and has a shape in which its width in a rightward and leftward direction is greater than its height, and a length in a forward and leftward direction is great. Right and left side wall portions 24 of the battery box 20 are integrally provided with receiving seat portions 24a of bolts to mount the side wall portions 24 of the battery box 20 to the pipe members 80 of the main frame 8. Nuts (not shown) are embedded into the receiving seat portions 24a, respectively.

A front wall portion 25 of the battery box 20 has a circular hole 25a in a substantially center portion in a vertical direction and in the rightward and leftward direction. The air guide duct 22 (see FIG. 1) extends forward from a peripheral portion of the circular hole 25a. An upper portion of the rear wall portion 26 of the battery box 20 has a circular hole 26a in a center portion in the rightward and leftward direction. The air discharge duct 23 (see FIG. 1) extends rearward from a peripheral portion of the circular hole 26a. A floor portion 27 connects lower ends of the right and left side wall portions 24, a lower end of the front wall portion 25 and a lower end of the rear wall portion 26 has a substantially rectangular shape. Bus bars 28 are provided to extend from an upper surface of the floor portion 27 to an inner surface of the rear wall portion 26.

As should be well known, the bus bars 28 are formed by molding alloy of copper or aluminum in an elongated band shape. Each of the bus bars 28 is an electric conductor in which it has connecting portions by which the bus bar 28 is connected to electrode terminals, in predetermined locations such as both end portions thereof, and a portion other than the connecting portions is coated with an insulating material. As will be described with reference to FIG. 3, the floor portion 27 of the battery box 20 has insertion holes 27a into which the electrode terminals 63 of the electric power control unit 60 are inserted. Connecting portions 28a having circular holes connected to the insertion holes 27a, respectively, are provided at one end portion of the bus bars 28.

Although only one module is shown in FIG. 2, for example, six batteries 21 are accommodated into the battery box 20 in a state in which the right module composed of the three batteries 21 and the left module composed of the three batteries 21 are separately placed. Each module is constructed as a detachably attachable module, in which the two rectangular batteries 21 are arranged in the forward and rearward direction of the electric motorcycle 1 and one module is placed on and above the two batteries 21 and integrally coupled to the two batteries 21 by stays 29 and the like. Positive and negative electrodes 21a are provided for each of the batteries 21 on a side surface (right side surface shown at a near side in FIG. 2 in the case of the left module in FIG. 2), which surface faces inside of a vehicle body during storage, and are connected to each other by the bus bar 21b.

The three batteries 21 are connected in series. A negative terminal of the battery 21 at an upper side which is lowest in electric potential is connected to a relay (not shown) via the bus bar 21b. A positive terminal of the battery 21 at a rear side of a lower side which is highest in electric potential, is connected to the bus bar 28 of the battery box 20 via, for example, an electric wire 21c, and connected to an electrode terminal 63 of the electric power control unit 60 via the bus bar 28. That is, the other end side of the bus bar 28 provided to extend over a range from the floor portion 27 of the battery box 20 to the rear wall portion 26 as described above, is raised up along the inner surface of the rear wall portion 26. The connecting portion 28b at the upper end is located in the vicinity of the opening of the battery box 20. The connecting portion 28b at the upper end is connected to the negative terminal of the battery 21 at the upper side by an electric wire 21c.

The right battery module is configured like the left battery module, although this will not be described in detail. The three batteries 21 are integrally coupled to each other and electrically connected in series. A positive terminal of the battery 21 at an upper side which is highest in electric potential is connected to a relay, while a negative terminal of the battery 21 at a rear side of a lower side which is lowest in electric potential is connected to the electrode terminal 63 of the electric power control unit 60 via the bus bar 28. That is, in this example, the right and left battery modules are connected in series via the relay, and a voltage of each module is set to about a half of a high voltage required to drive the electric motorcycle 1.

In a state in which the three batteries 21 corresponding to the left module and the three batteries 21 corresponding to the right module are accommodated into the battery accommodating box 20, there is a gap which becomes a passage of the ram air between the right and left modules. Since the electrodes 21a and the bus bars 21b connecting them are placed on the inner side surfaces of the batteries 21 facing this gap, they are directly exposed to the ram air and thereby effectively cooled.

—Mounting Structure of Electric Power Control Unit—

As described above, in the present embodiment, the electric power control unit 60 is mounted to the battery box 20 from below. Since the battery box 20 made of a resin intervenes between the main frame 8 and the electric power control unit 60, the electric power control unit 60 can be supported in a vibration-proof manner, as compared to a case where the electric power control unit 60 is directly supported on the vehicle body frame such as the main frame 8, the pivot frame 9, and the like. In addition, as will be described below, the case 62 of the electric power control unit 60 is joined to the floor portion 27 of the battery box 20 from below, and thus, the high-voltage line of the battery box 20 is connected to the high-voltage line of the electric power control unit 60 in a state in which they are isolated from their surroundings.

Figure 3:
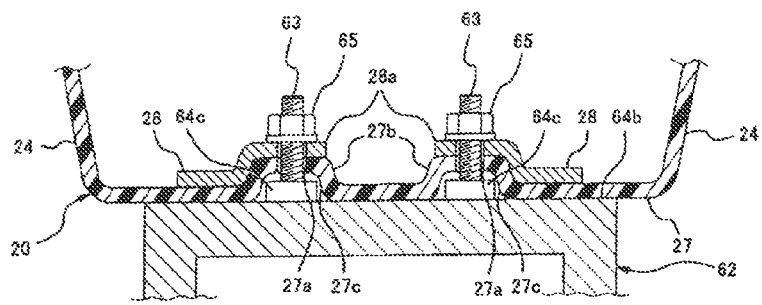
FIG. 3 is an enlarged view showing a connecting structure of an electrode terminal.

As schematically shown in FIG. 2, the case 62 of the electric power control unit 60 has a flat rectangular shape. A pair of positive and negative electrode terminals 63 connected to the power module 61 accommodated into the case 62 protrudes upward from an upper wall portion 64 of the case 62. The floor portion 27 of the battery box 20 has the insertion holes 27a formed by the pair of circular holes such that the insertion holes 27a penetrate the floor portion 27 and correspond to the pair of electrode terminals 63, respectively. As shown in FIG. 3 in an enlarged manner, the electrode terminals 63 inserted into the insertion holes 27a from below protrude upward from the floor portion 27 of the battery box 20 and are connected to the connecting portions 28a of the bus bars 28, respectively.

More specifically, protruding portions 64a protruding substantially horizontally in the forward and rearward direction are provided at four corners of the upper wall portion 64 of the case 62 of the electric power control unit 60. The protruding portions 64a have through holes into which bolts are inserted to fasten the case 62 to the floor portion 27 of the battery box 20. The upper wall portion 64 of the case 62 has a flat surface 64b (joint surface) at one side (forward side in a state in which the case 62 is built into the electric motorcycle 1) in a lengthwise direction. The flat surface 64b is joined to the flat lower surface of the floor portion 27 of the battery box 20.

In addition, in the example illustrated, rectangular seat portions 64c swelling upward are provided on relatively inward regions (inward regions surrounded by the joint surface) of the flat surface 64b of the upper wall portion 64 of the case 62. The electrode terminals 63 protrude from upper surfaces of the seat portions 64c, respectively. As shown in FIG. 3 in an enlarged manner, the floor portion 27 of the battery box 20 has swelling portions 27b swelling upward to surround the insertion holes 27a, and recesses 27c are formed on reverse surfaces of the swelling portions 27b to contain the seat portions 64c, respectively.

The case 62 of the electric power control unit 60 is mounted to the floor portion 27 of the battery box 20 from below. The case 62 is fastened to the floor portion 27 of the battery box 20 by bolts penetrating the protruding portions 64a at four corners of the upper wall portion 64, respectively. Thereby, as shown in FIG. 3, the electrode terminals 63 are inserted into the insertion holes 27a of the floor portion 27 of the battery box 20, respectively, from below, and the seat portions 64c of the upper wall portion 64 of the case 62 are placed into the recesses 27c of the floor portion 27, respectively. The lower surface of the floor portion 27 and the flat surface 64b of the upper wall portion 64 of the case 62 are joined together so as to surround the seat portions 64c.

That is, the electrode terminals 63 applied with high voltages are surrounded by the joint surface of the battery box 20 and the joint surface of the case 62 and thereby are isolated from the surroundings. Thereby, high safety is achieved. In addition, rain water, mud, and the like are less likely to enter the joint surface of the battery box 20 and the joint surface of the case 62. If a little rain water or the like enters a clearance between the joint surfaces, it is less likely to reach upper surfaces of the seat portions 64c which are higher than the joint surfaces. Therefore, the rain water or the like having entered the clearance between the joint surfaces is less likely to contact the electrode terminals 63.

The electrode terminals 63 are inserted into the insertion holes 27a, respectively, from below, as described above, penetrate the connecting portions 28a of the bus bars 28 surrounding the insertion holes 27a, and protrude upward, respectively. Male threads are formed on outer peripheries of the electrode terminals 63, respectively. Nuts 65 threadingly engaged with the male threads tighten the connecting portions 28a of the corresponding bus bars 28, respectively. If the rain water and the like enter the battery box 20, or water droplets stay in the floor portion 27 of the battery box 20, the water is less likely to contact the electrode terminals 63 and the connecting portions 28a of the bus bars 28 which are located above the upper surfaces (swelling surfaces) of the swelling portions 27b.

Therefore, in accordance with the structure for mounting the electric power control unit 60 to the battery box 20 as described above, the electrode terminals 63 protruding from the case 62 of the electric power control unit 60 are inserted into the insertion holes 27a of the floor portion 27 of the battery box 20 and are connected to the bus bars 28 attached inside thereof. Therefore, the high-voltage lines between the batteries 21 and the power module 61 are minimized in length, and not exposed to outside, which eliminates a need for a cover or the like covering the high-voltage lines.

The insertion holes 27a are formed in the floor portion 27 of the battery box 20 which opens upward, and the electrode terminals 63 of the electric power control unit 60 mounted to the floor portion 27 of the battery box 20 from below protrude upward. Therefore, before the batteries 21 are accommodated into the battery box 20, an operator can carry out a connecting work in an easy attitude with the operator's hands inserted into the battery box 20 from above, while seeing an interior of the battery box 20 from above and visually checking the electrode terminals 63 and the connecting portions 28a of the bus bars 28.

Figure 4A:
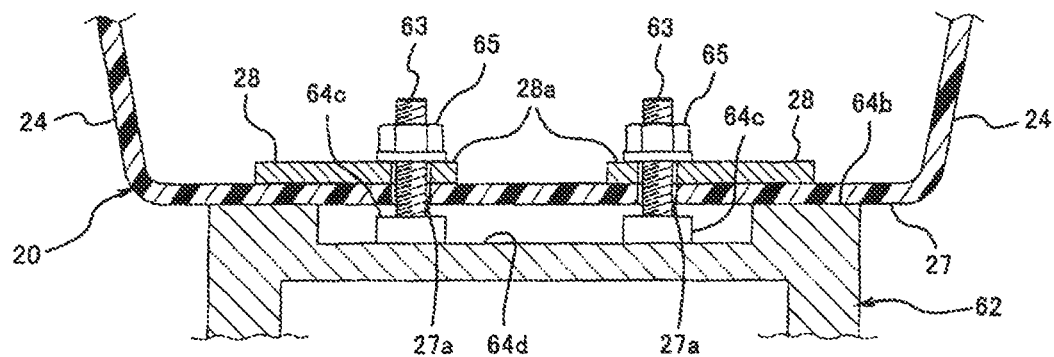
FIG. 4A is a view showing a modified example of the connecting structure, corresponding to FIG. 3.

In addition to the above described configuration in which the electrode terminals 63 of the electric power control unit 60 protrude upward from the flat surface 64b of the upper wall portion 64 of the case 62, for example, as shown in FIG. 4A, there may be provided a stepped surface 64d in an inward region of the flat surface 64b of the upper wall surface 64 such that the stepped surface 64d is surrounded by the flat surface 64b, and the electrode terminals 63 may protrude from the stepped surface 64d. Although in the illustrated example, the seat portions 64c are provided on the stepped surface 64d and the electrode terminals 63 protrude from the upper surfaces of the seat portions 64c, the seat portions 64c may be omitted. By providing the stepped surface 64d in this way, rain water or the like which has entered the clearance between the joint surface of the floor portion 27 of the battery box 20 and the joint surface of the upper wall portion 64 of the case 62 is less likely to contact the electrode terminals 63.

Figure 4B:
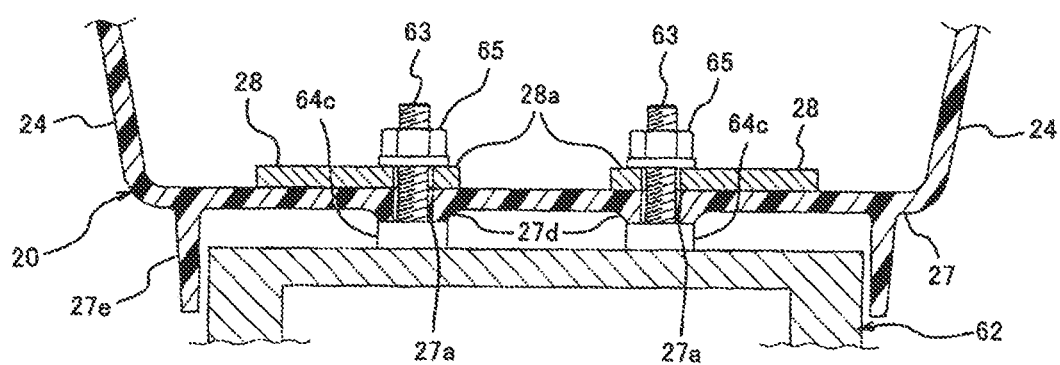
FIG. 4B is a view showing another modified example of the connecting structure, corresponding to FIG. 3.

For example, as shown in FIG. 4B, boss portions 27d protruding downward from the floor portion 27 of the battery box 20 may be provided to face the seat portions 64c of the case 62, and the seat portions 64c may be butted with the boss portions 27d from below, respectively. In this case, the floor portion 27 of the battery box 20 may be provided with a frame portion 27e extending toward the upper wall portion 64 of the case 62 of the electric power controller 60 which faces the floor portion 27 below the floor portion 27 such that the frame portion 27e surrounds its upper surface (facing surface).

As shown in FIG. 4B, the frame portion 27e has a rectangular frame shape which is slightly greater in size than the upper wall portion 64 of the case 62, and extends downward from the floor portion 27 of the battery box 20 such that its lower edge is located below the upper surface of the upper wall portion 64. The frame portion 27e can effectively prevent entry of rain water, mud, etc., into a space between the battery box 20 and the case 62.

—Structure for Cooling Electric Power Control Unit—

Figure 5:
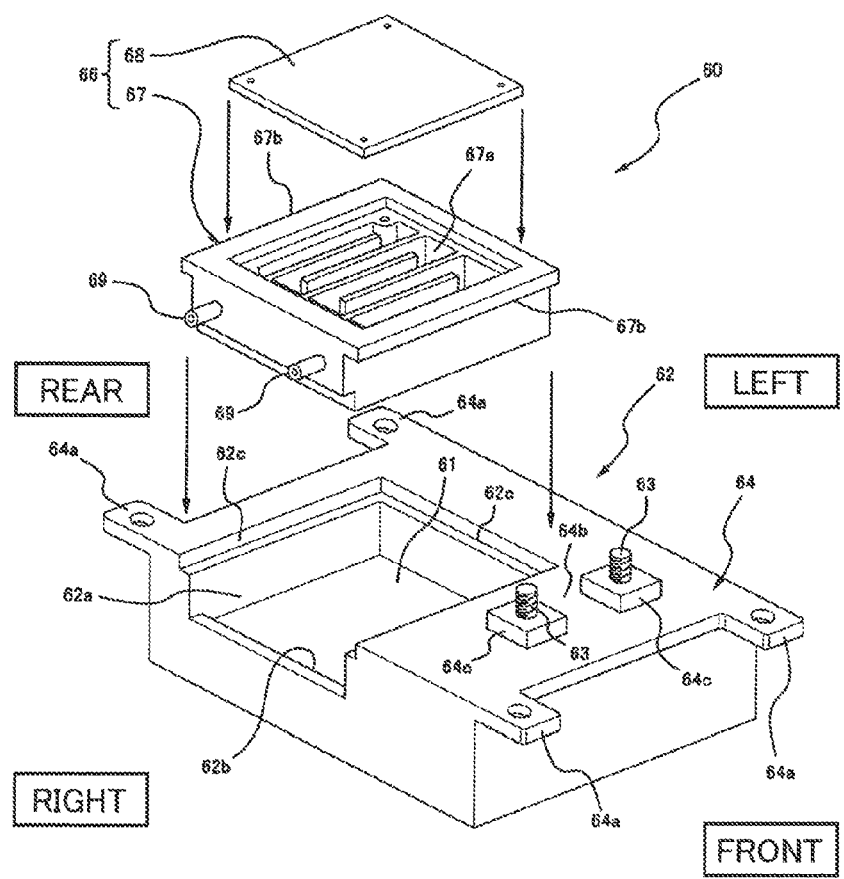
FIG. 5 is a perspective view of a structure for mounting a cooler to an electric power control unit.
Figure 6:
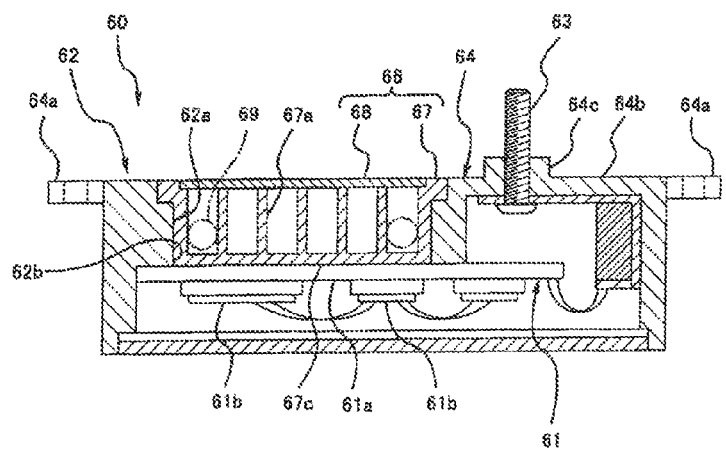
FIG. 6 is a cross-sectional view showing a cooling structure of the electric power control unit.

Next, the structure for cooling the electric power control unit 60 mounted to the battery box 20 as described above will be described with reference to FIGS. 5 and 6. FIG. 5 is a perspective view of a structure for mounting the cooler 66 as a separate component to the electric power control unit 60. FIG. 6 is a cross-sectional view showing the structure for cooling the power module 61 by the cooler 66.

As described above with reference to FIG. 2, the case 62 of the electric power control unit 60 has a flat rectangular shape, as a whole. The flat surface 64b to be joined to the floor portion 27 of the battery box 20 is provided at one side (rearward side in a state in which the case 62 is mounted in the electric motorcycle 1, hereinafter, the terms "forward side" and "rearward side" are simply used) in a lengthwise direction of the upper wall portion 64. As shown in FIG. 5, at the rearward side of the flat surface 64b, there is provided a fitting portion 62a having a rectangular cross-section which is recessed from an upper surface to a right side surface. The cooler 66 is fitted into the fitting portion 62a.

As described above, the lower surface of the battery box 20 protrudes obliquely forward to be lower than the lower pipe member 80 of the main frame 8. Therefore, the electric power control unit 60 mounted to the lower surface of the battery box 20 directly receives the ram air from forward and thereby is cooled efficiently. In addition to this, in the present embodiment, the power module 61 which generates heat of a great amount is cooled by the dedicated cooler 66.

As shown in FIG. 5, a bottom of the fitting portion 62a opens inside the case 62 of the electric power control unit 60. The cooler 66 is mounted to close the opening 62b from outward. As shown in FIG. 6, the power module 61 is disposed inside of the case 62 so as to close the opening 62b from inward. A lower wall (i.e., lower wall 67c of a casing 67 of the cooler 66) is in contact with a substrate 61a of the power module 61 from above. A heat radiation grease having a high electric conductivity is applied between the lower wall of the cooler 66 and the substrate 61a.

As shown in FIG. 6, a power semiconductor chip 61b such as an IGBT is mounted to the substrate 61a of the power module 61, and faces the opening 62b of the case 62 of the electric power control unit 60 such that its reverse surface is directed upward. In a state in which the cooler 66 mounted so as to close the opening 62b from above is in contact with the substrate 61a of the power module 61, heat exchange occurs between the substrate 61a and oil flowing through a passage 67a (cooling jacket) inside of the cooler 66.

As shown in FIG. 5, the cooler 66 includes a casing 67 which is substantially equal in size to the fitting portion 62a of the case 62 of the electric power control unit 60, and a lid member 68 of a rectangular plate shape which closes an upper opening of the casing 67. The casing 67 and the lid member 68 are manufactured by molding, for example, aluminum alloy. A flange 67b is provided along a front edge, a rear edge, and a left edge of an upper portion of the casing 67. The flange 67b is internally fitted to a stepped portion 62c formed along a front edge, a rear edge and a left edge of the fitting portion 62a of the case 62 of the electric power control unit 60, and fastened to it by screws, or the like, (not shown).

Since the cooler 66 is detachably attached to the case 62, for example, only the cooler 66 is detached from the case 62 during the maintenance, or the substrate 61a of the power module 61 with the cooler 66 attached to the case 62 can be detached. Thus, maintenance can be carried out easily. In a case where a desired cooling capability changes depending on the weight of the electric motorcycle 1, the size of the driving motor 30, etc., a desired and sufficient cooling capability can be ensured merely by changing the cooler 66 while using the same case 62.

The casing 67 of the cooler 66 is provided with the passage 67a through which cooling oil flows. The passage 67a extends from a right front corner of the casing 67 toward a left end, then turns back at the left end, then extends toward a right end, then turns back at the right end, and then extends toward the left end again. Thus, the passage 67a has a labyrinth structure which guides the oil in a rearward direction while turning back the flow of the oil at the right end and at the left end. Since the flow of the oil is turned back in this way, separation of a boundary layer of the oil from a passage wall surface can be facilitated, which improves efficiency of heat exchange by the cooler 66.

Pipe members 69 are provided to penetrate a forward portion and a rearward portion of a right side wall of the casing 67 so as to correspond to an inlet and an outlet of the passage 67a, respectively. As the oil as the coolant, lubricating oil of the motor unit 50 is used. As can be seen from FIG. 1, the upper hose 72 is coupled to the forward pipe member 69. The oil flowing from the oil cooler 70 is introduced into the passage 67a via the upper hose 72. The return hose 73 is coupled to the rearward pipe member 69. The oil flowing out of the passage 67a flows downward into the motor unit 50 via the return hose 73. Since the electric power control unit 60 is placed immediately above the motor unit 50, a loss caused by actuation of the oil pump 52 for feeding the oil with a pressure to the cooler 66 is less.

Figure 7:
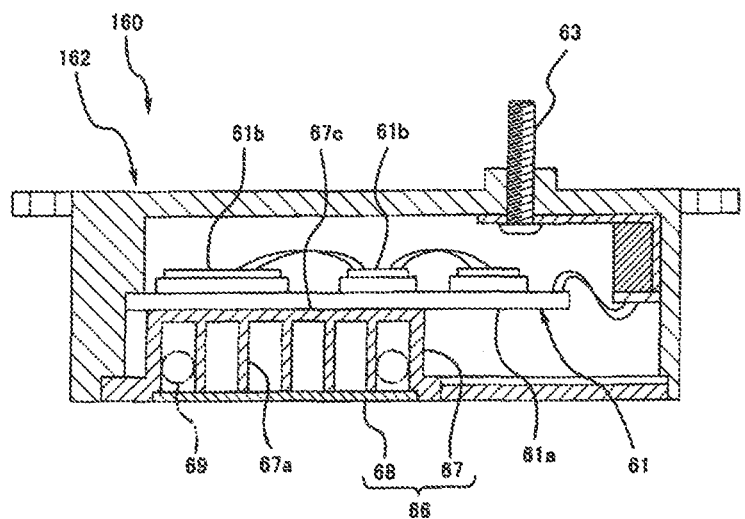
FIG. 7 is a view showing a modified example of the cooling structure, corresponding to FIG. 6.

Instead of placing the cooler 66 in the upper portion of the case 62 of the electric power control unit 60, for example, as shown in FIG. 7, the cooler 66 may be placed in a lower portion inside of a case 162 of an electronic power control unit 160. In this construction, a loss caused by actuation of the oil pump 52 for feeding the oil with a pressure to the cooler 66 can be further lessened in the layout in which the electric power control unit 160 is placed above the motor unit 50.

As can be seen from FIG. 6, the opening 62b of the case 62 of the electric power control unit 60 closed by the casing 67 of the cooler 66 as described above has a smaller size than the substrate 61a of the power module 61, and is formed in a portion of the substrate 61a, to be precise, a portion corresponding to the power semiconductor chip 61b such as an IGBT. That is, the cooler 66 is configured not to cool the entire substrate 61a but to concentrically cool the power semiconductor chip 61b which generates heat of a great amount. Because of this, a size of the cooler 66 can reduced, and an amount of the oil flowing through the cooler 66 can be reduced.

The power module 61 is accommodated into the case 62 such that the substrate 61a is oriented upward. The cooler 66 to which the upper surface of the substrate 61a is joined efficiently cools the power module 61. The heat radiated from the substrate 61a in a downward direction is dispersed from the wall portion of the case 62. That is, the upper portion of the case 62 joined to the floor portion 27 of the battery box 20 can be cooled by the cooler 66, while the lower portion of the case 62 can be efficiently cooled by the ram air. Because of this, the size of the cooler 66 can be further reduced.

OTHER EMBODIMENTS

The above described embodiment is merely exemplary, and is in no way intended to limit the present invention, its applications, and its uses. For example, although in the present embodiment, the battery box 20 is placed to be inclined along the inclination of the main frame 8 of the electric motorcycle 1 such that the floor portion 27 is directed downward and obliquely forward, the present invention is not limited to this layout. In addition, the battery box 20 need not be made of resin.

It is not necessary to mount the case 62 of the electric power control unit 60 to the floor portion 27 of the battery box 20 as described above. For example, the case 62 may be mounted to the rear wall portion 26 of the battery box 20 from rearward. In this case, in view of the fact that the oil is fed with a pressure from the motor unit 50, the case 62 is preferably mounted to the battery box 20 in a location as low as possible in the vicinity of the motor unit 50.

In that case, the structures described with reference to FIGS. 3, 4A and 4B are preferably employed. That is, the case 62 of the electric power control unit 60 is preferably mounted in an inclined state such that the upper wall portion 64 is joined to the rear wall portion 26 of the battery box 20 from rearward. This allows the flat surface 64b of the upper surface of the case 62 to be joined to the flat surface of the rear wall portion 26 of the battery box 20.

In the present embodiment, the swelling portions 27b provided on the floor portion 27 of the battery box 20 may be provided on the rear wall portion 26 such that they swell in a forward direction (inward in the battery box 20). And, the seat portions 64c of the upper wall portion 64 of the case 62 may be placed into the recesses 27c on the reverse side of the swelling portions 27b from rearward.

The electric conductors connecting the electrodes 21 a of the batteries 21 to the electrode terminals 63 of the electric power control unit 60 inside of the battery box 20 are not limited to the bus bars 28 of the present embodiment. For example, electric wires may be provided to extend in a range from the floor portion 27 of the battery box 20 to the wall portions.

Although in the above embodiment, the electric motorcycle 1 has been described, the electric vehicle of the present invention is not limited to the motorcycle, but may be, for example, an ATV (all terrain vehicle), a small truck, etc.

INDUSTRIAL APPLICABILITY

As described above, in the straddle-type electric vehicle of the present invention, electric connecting work between the electric storage device and the electric power control unit can be easily carried out, the high-voltage lines can be minimized in length, and the high-voltage lines are not exposed to outside. Therefore, the straddle-type electric vehicle is very useful in the electric motorcycle.

REFERENCE CHARACTERS LIST 1 electric motorcycle (electric vehicle)
2 front wheel
3 rear wheel
5 head pipe
8 main frame
20 battery box (accommodating box of electric storage device)
21 battery (electric storage device)
26 rear wall portion of battery box (rear side surface of accommodating box)
27 floor portion of battery box
27a insertion hole
27b swelling portion
27c recess
28 bus bar (electric conductor)
30 driving motor (electric motor)
60 electric power control unit (electric power controller)
61 power module (electric circuit)
62 case
63 electrode terminal
64b flat surface of upper surface of case (joint surface)
64c seat portion

The invention claimed is:

1. A straddle electric vehicle comprising:
an electric motor for driving the electric vehicle;
an electric storage device for storing electric power supplied to the electric motor; and
an electric power controller for controlling the electric power supplied from the electric storage device to the electric motor;
wherein a case of the electric power controller is mounted from a location outward of an accommodating box of the electric storage device from outward;
wherein the case is provided with an electrode terminal connected to an electric circuit inside of the case such that the electrode terminal protrudes outward from the case; and
wherein a floor portion or a side wall portion of the accommodating box has an insertion hole into which the electrode terminal is inserted, and the electrode terminal which is inserted into the insertion hole and protrudes into the inside of the accommodating box is connected to an electrode of the electric storage device via an electric conductor.

2. The straddle electric vehicle according to claim 1,
wherein the accommodating box opens upward, and the floor portion of the accommodating box has the insertion hole;
wherein the case is mounted to the floor portion of the accommodating box from below; and
wherein the electrode terminal protruding from an upper surface of the case is inserted into the insertion hole.

3. The straddle electric vehicle according to claim 2,
wherein the accommodating box is placed in an inclined state such that the floor portion is directed downward and obliquely forward.

4. The straddle electric vehicle according to claim 3,
wherein a vehicle body frame includes a head pipe and a main frame extending rearward from the head pipe such that the main frame is inclined downward;
wherein the accommodating box extends along the main frame between a front wheel and a rear wheel, and a lower surface of the floor portion of the accommodating box protrudes obliquely forward to be lower than a lower edge of the main frame; and
wherein the case of the electric power controller is mounted to the floor portion of the accommodating box in a rearward location.

5. The straddle electric vehicle according to claim 1,
wherein the floor portion or the side wall portion which has the insertion hole is provided with a frame portion extending toward a facing surface of the case which faces the floor portion or the side wall portion such that the frame portion surrounds the facing surface.

6. The straddle electric vehicle according to claim 1,
wherein the floor portion or the side wall portion which has the insertion hole is provided with a swelling portion which surrounds the insertion hole and swells inward in the accommodating box, and the insertion hole opens in a swelling surface of the swelling portion.

7. The straddle electric vehicle according to claim 6,
wherein the case is provided with a seat portion swelling outward such that the seat portion is placed into a recess provided at a reverse side of the swelling portion of the accommodating box, and the electrode terminal protrudes from the seat portion.

8. The straddle electric vehicle according to claim 1,
wherein the electric conductor is elongated and is provided to extend from a location in the vicinity of the insertion hole of the floor portion or the side wall portion of the accommodating box to an upper portion of the accommodating box.

9. The straddle electric vehicle according to claim 1,
wherein the accommodating box is made of resin and supported on a vehicle body frame.

10. The straddle electric vehicle according to claim 1,
wherein the case is mounted to a rear side wall portion of the accommodating box from rearward.

11. A mounting structure of an electric power controller in a straddle electric vehicle comprising: an electric motor for driving the electric vehicle; and an electric power controller for controlling electric power supplied to the electric motor;
   wherein an electric storage device for storing the electric power supplied to the electric motor is accommodated into an accommodating box;
   wherein a case of the electric power controller is mounted from a location outward of the accommodating box;
   wherein the case is provided with an electrode terminal connected to an electric circuit inside of the case such that the electrode terminal protrudes outward from the case; and
   wherein a floor portion or a side wall portion of the accommodating box has an insertion hole into which the electrode terminal is inserted, and the electrode terminal which is inserted into the insertion hole and protrudes into the inside of the accommodating box is connected to an electrode of the electric storage device via an electric conductor.

* * * * *